US012684075B2

(12) United States Patent
     Polavarapu et al.

(10) Patent No.:     US 12,684,075 B2
(45) Date of Patent:         Jul. 14, 2026

(54) SYSTEMS AND METHODS FOR DIGITAL DOCUMENT EXCHANGE

(71) Applicant: JPMORGAN CHASE BANK, N.A., New York, NY (US)

(72) Inventors: Lakshmi Polavarapu, Frisco, TX (US); Vijay Misra, Plano, TX (US)

(73) Assignee: JPMORGAN CHASE BANK, N.A., New York, NY (US)

( * ) Notice:     Subject to any disclaimer, the term of this patent is extended or adjusted under 35 U.S.C. 154(b) by 393 days.

(21) Appl. No.: 18/495,533

(22) Filed:     Oct. 26, 2023

(65)             Prior Publication Data
     US 2025/0142004 A1     May 1, 2025

(51) Int. Cl.
     H04N 1/00         (2006.01)
     G06N 20/00        (2019.01)
     H04N 1/21         (2006.01)
(52) U.S. Cl.
     CPC ......... H04N 1/00095 (2013.01); G06N 20/00 (2019.01); H04N 1/21 (2013.01)

(58) Field of Classification Search
     None
     See application file for complete search history.

(56)             References Cited

U.S. PATENT DOCUMENTS

2019/0250780 A1*   8/2019   Feng ..................... G06Q 10/101
2023/0028302 A1*   1/2023   Kyleman ................ G06F 16/93

* cited by examiner

*Primary Examiner* — Lennin R Rodriguezgonzalez
(74) *Attorney, Agent, or Firm* — GREENBERG TRAURIG LLP

(57)             ABSTRACT

Systems and methods for digital document exchange are disclosed. According to an embodiment, a method for digital document exchange may include: (1) receiving, by a document exchange computer program, a document; (2) ingesting, by the document exchange computer program, the document; (3) identifying, by the document exchange computer program, a folder for the document; (4) storing, by the document exchange computer program, the document in the folder; (5) identifying, by the document exchange computer program, a target for the document; and (6) notifying, by the document exchange computer program, the target that the document was received.

15 Claims, 3 Drawing Sheets

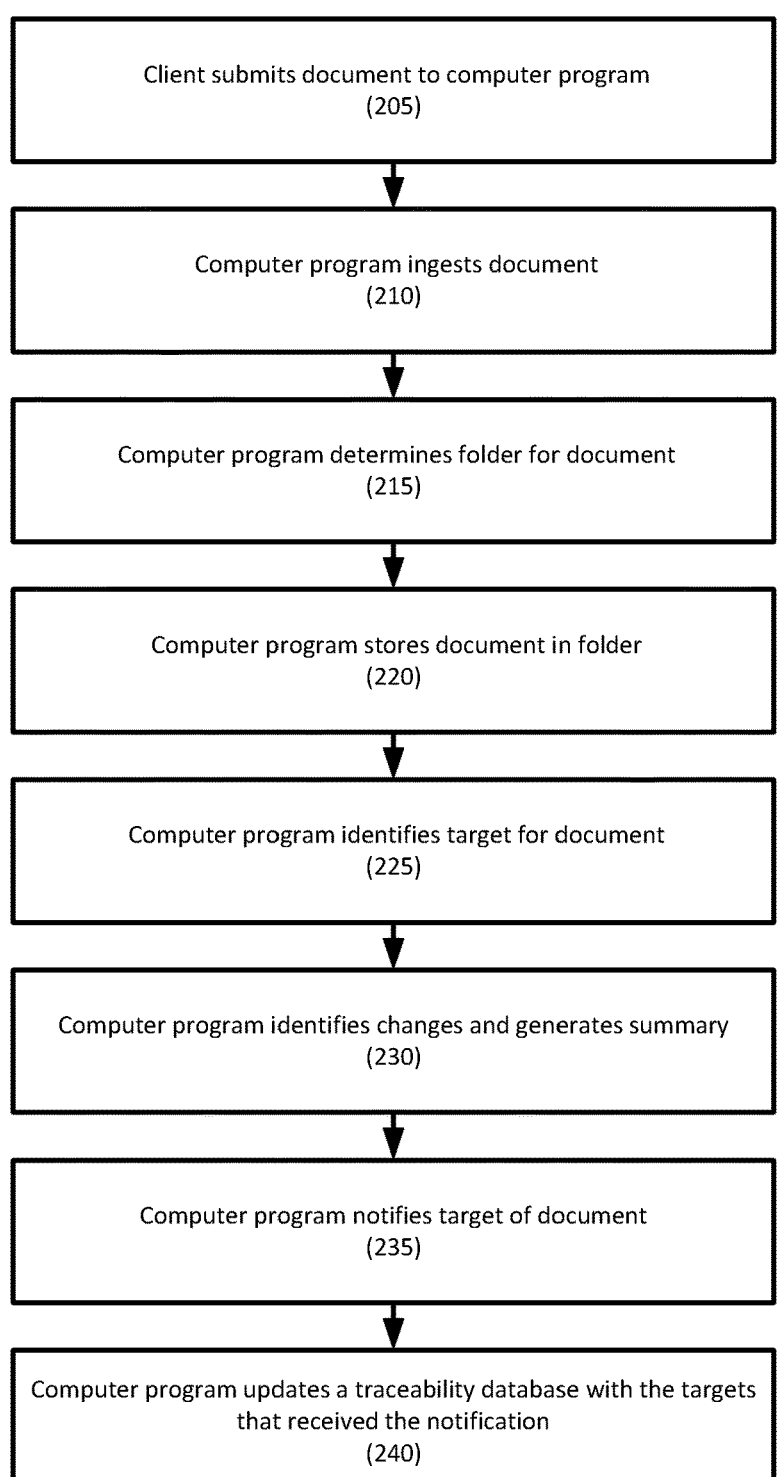

Client submits document to computer program
(205)

Computer program ingests document
(210)

Computer program determines folder for document
(215)

Computer program stores document in folder
(220)

Computer program identifies target for document
(225)

Computer program identifies changes and generates summary
(230)

Computer program notifies target of document
(235)

Computer program updates a traceability database with the targets
that received the notification
(240)

FIGURE 2

SYSTEMS AND METHODS FOR DIGITAL DOCUMENT EXCHANGE

BACKGROUND OF THE INVENTION

1. Field of the Invention

Embodiments relate to systems and methods for digital document exchange.

2. Description of the Related Art

Clients submitting documents to an institution often must submit the documents to a common shared electronic mail mailbox. This is inefficient and lacks security.

SUMMARY OF THE INVENTION

Systems and methods for digital document exchange are disclosed. According to an embodiment, a method for digital document exchange may include: (1) receiving, by a document exchange computer program, a document; (2) ingesting, by the document exchange computer program, the document; (3) identifying, by the document exchange computer program, a folder for the document; (4) storing, by the document exchange computer program, the document in the folder; (5) identifying, by the document exchange computer program, a target for the document; and (6) notifying, by the document exchange computer program, the target that the document was received.

In one embodiment, the step of ingesting the document may include: performing optical character recognition on the document.

In one embodiment, the step of ingesting the document may include: determining, by the document exchange computer program, that the document may include relevant data, and determining, by the document exchange computer program, that the document is complete.

In one embodiment, the method may also include updating, by the document exchange computer program, a checklist to reflect receipt of the document.

In one embodiment, the document exchange computer program generates the checklist using a trained machine learning engine that may be trained to predict documents required for a transaction type.

In one embodiment, the folder may be identified based on a subject of the document, a party to the document, and/or a submitter of the document.

In one embodiment, the method may also include: comparing, by the document exchange computer program, the document to a prior version of the document to identify a change; and providing, by the document exchange computer program, the change to the target.

In one embodiment, the method may also include: determining, by the document exchange computer program and using a large language model, an importance of the change; and providing, by the document exchange computer program, the importance of the change to the target.

In one embodiment, the document exchange computer program predicts the target using a machine learning system.

According to another embodiment, a non-transitory computer readable storage medium may include instructions stored thereon, which when read and executed by one or more computer processors, cause the one or more computer processors to perform steps comprising: receiving a document; ingesting the document; identifying a folder for the document; storing the document in the folder; identifying a target for the document; and notifying the target that the document was received.

In one embodiment, the step of ingesting the document may include instructions that, when executed by the one or more computer processors, cause the one or more computer processors to perform optical character recognition on the document.

In one embodiment, the step of ingesting the document may include instructions that, when executed by the one or more computer processors, cause the one or more computer processors to determine that the document may include relevant data, and to determine determining that the document is complete.

In one embodiment, the non-transitory computer readable storage medium may also include instructions that, when executed by the one or more computer processors, cause the one or more computer processors to update a checklist to reflect receipt of the document.

In one embodiment, the checklist may be generated using a trained machine learning engine that may be trained to predict documents required for a transaction type.

In one embodiment, the folder may be identified based on a subject of the document, a party to the document, and/or a submitter of the document.

In one embodiment, the non-transitory computer readable storage medium may also include instructions that, when executed by the one or more computer processors, cause the one or more computer processors to perform steps comprising: comparing the document to a prior version of the document to identify a change; and providing the change to the target.

In one embodiment, the non-transitory computer readable storage medium may also include instructions that, when executed by the one or more computer processors, cause the one or more computer processors to perform steps comprising: determining, using a large language model, an importance of the change; and providing the importance of the change to the target.

In one embodiment, the target may be predicted using a machine learning system.

BRIEF DESCRIPTION OF THE DRAWINGS

For a more complete understanding of the present invention, the objects and advantages thereof, reference is now made to the following descriptions taken in connection with the accompanying drawings in which:

FIG. 2 illustrates a method for digital document exchange according to an embodiment;

DETAILED DESCRIPTION OF PREFERRED EMBODIMENTS

Embodiments relate to systems and methods for digital document exchange.

Embodiments may provide document upload an ingestion capability, whereby clients or third parties submit required documents for onboarding and monitoring. Embodiments may also send reminders to clients or third parties to provide documents, may create a checklist for submitting/tracking document submission, etc.

Embodiments may be integrated with workflow systems that can be applied to loan life cycle, document life cycle, covenant life cycle, collateral life cycle and many more.

Embodiments may use a library of centralized document templates and for ongoing modifications, guidance, and communications. In one embodiment, the templates may be organized by type, business entity, business unit, etc.

Embodiments may provide a virtual deal room for document exchange, which may provide a secure digital channel for multi-party document exchange and digital ingestion of final documents.

Figure 1:
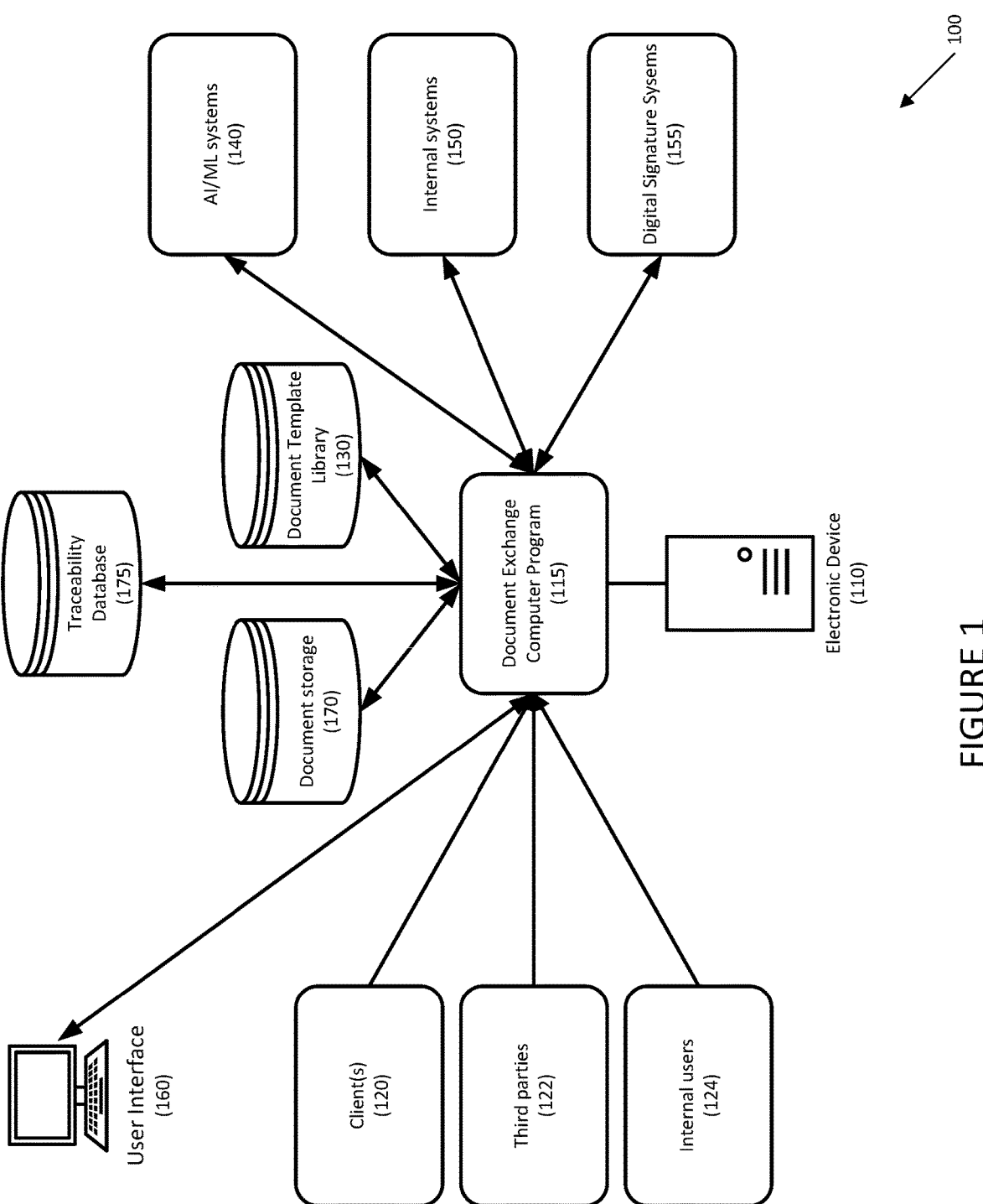
FIG. 1 illustrates a system for digital document exchange according to an embodiment.

Referring to FIG. 1, a system for digital document exchange is disclosed according to an embodiment. System 100 may include electronic device 110, which may be a server (e.g., physical and/or cloud-based), one or more clients 120, one or more third parties 122, one or more internal users 124, document template library 130, artificial intelligence/machine learning (AI/ML) systems 140, internal systems 150, digital signature systems 155, and user interfaces 160. Electronic device 110 may execute document exchange computer program 115, which may interface with clients 120, third parties 122, and/or internal users 124. Document exchange computer program 115 may ingest documents from clients 120, third parties 122, and/or internal users 124, may provide clients 120, third parties 122, and/or internal users 124 with access to documents in document template library 130, may provide document statuses and/or checklists to clients 120, third parties 122, and/or internal users 124, etc.

Once ingested, document exchange computer program 115 may maintain documents in document storage 170. Documents in document storage 170 may be arranged by subject, business entity, business unit, or any other suitable organization. In one embodiment, document exchange computer program 115 may identify the target (e.g., one of internal systems 150, external systems, client 120, one of third parties 122, one of internal users 124 etc.) for the document or a notification that the document was received. Document exchange computer program 115 may use AI/ML systems 140 to predict the target.

Document exchange computer program 115 may provide a virtual exchange room by which clients 120, third parties 122, and/or internal users 124 can provide documents to be ingested and exchanged. In one embodiment, the virtual exchange room may provide security for the document(s) and provide a platform for negotiation and finalizing a deal.

Document exchange computer program 115 may receive a document checklist of required documents from clients 120, third parties 122, and/or internal users 124. In one embodiment, the document checklist may be specific to a transaction; in another embodiment, the document checklist may be specific to a type of transaction; in still another embodiment, the document checklist may be specific to client 120, third party 122, or internal user; in still another embodiment, the document checklist may be generic.

In one embodiment, the document checklist may be received from client 120, third party 122, or internal user 124. In another embodiment, the document checklist may be provided by the financial institution. In another embodiment, document exchange computer program 115 may generate the document checklist using AI/ML systems 140. For example, AI/ML systems 140 may be trained with documents from prior transactions to predict documents required for a current transaction.

The checklist may identify the documents required, and may identify targets for the documents.

Document exchange computer program 115 may update the document checklist as documents are ingested and determined to be correct and complete.

Once the documents required by the checklist are received, document exchange computer program 115 may group the documents together. Document exchange computer program 115 may notify the target of the document of receipt.

Document exchange computer program 115 may also access AI/ML systems 140 that may review ingested documents for completeness, correctness of data, etc. AI/ML systems 140 may also be used to identify how the ingested documents are arranged in document storage 170.

If an incorrect document is ingested (e.g., a driver's license instead of a financial statement), document exchange computer program 115 may inform the submitter and request that the correct document be provided.

In one embodiment, after a document is ingested, document exchange computer program 115 may compare the document to a prior version of the document, to a counterparty's version of the document, etc., and may identify the changes. It may then summarize the changes for client 120, third party 122, and/or internal user 124. Document exchange computer program 115 may also use a large language model (LLM) to predict the importance or materiality of the changes and may return the prediction to client 120, third party 122, and/or internal user 124.

Document exchange computer program 115 may provide ingested documents that have been reviewed for completeness to internal systems 150 for consumption. For example, in a financial system, internal systems 150 may include loan decisioning systems, credit approval systems, etc.

In one embodiment, document exchange computer program 115 may provide document tracking and traceability for auditing. Thus, internal systems 150 may check with document exchange computer program 115 before requesting a new document from client 120, third party 122, or internal user 124 to see if the document has already been requested and/or received.

Traceability information may be maintained in traceability database 175.

System 100 may include digital signature system 155, which may provide a mechanism by which users can digitally sign documents. For example, the documents may be signed with digital signatures, certificates, tokens, keys, etc.

Referring to FIG. 2, a method for digital document exchange is disclosed according to an embodiment.

In step 205, a client, a third party, or an internal user may submit a document to a computer program, such as a document exchange computer program. In one embodiment, the document may be an image or a scan of a document, a portable document format (PDF) version of a document, etc.

In step 210, the document exchange computer program may ingest the document. For example, the document exchange computer program may perform optical character recognition on the document as needed, and may use an AI/ML system to determine if the correct document has been ingested.

In one embodiment, the document exchange computer program may also evaluate the document to determine whether the document is complete. For example, the document exchange computer program may verify that all necessary document fields have been completed with relevant data. In one embodiment, AI/ML systems may be used to determine if the data is relevant.

In one embodiment, the document exchange computer program may update a document checklist to indicate that the document has been received if the document is correct and complete.

In step 215, the document exchange computer program may determine a folder for the document. For example, an AI/ML system may review the document and may identify a subject, a business entity, a business unit, the submitter of the document, a party to a transaction, etc., and may store the document in document storage appropriately.

In step 220, the document exchange computer program may store the document in document storage in the appropriate folder.

In step 225, the document exchange computer program may identify a target (e.g., an internal system, an external system, the client, the third party, the internal user, etc.) for the document, or for a notification that the document was received. For example, the document exchange computer program may determine a target for the document based on the target being specified in the document checklist. The document exchange computer program may use an AI/ML system to predict the target.

In step 230, the document exchange computer program may compare the ingested document to a prior version of the document, a counterparty version of the document, etc. to identify any changes to the document, and may generate a summary of the changes using, for example, a LLM. The LLM may also be used to determine the importance or materiality of the changes to the overall document.

For example, if the document has changed, a LLM trained model may compare the verbiage that changed to identify material and non-material changes to the document. It may also be trained to identify the impact of the changes on, for example, a deal that may be being negotiated.

In step 235, the document exchange computer program may send the document or a notification of receipt of the document to the target. It may also send a summary of any changes as applicable.

In step 240, the document exchange computer program may update a traceability database with information regarding the target(s) that received the document or notification that the document was received.

Figure 3:
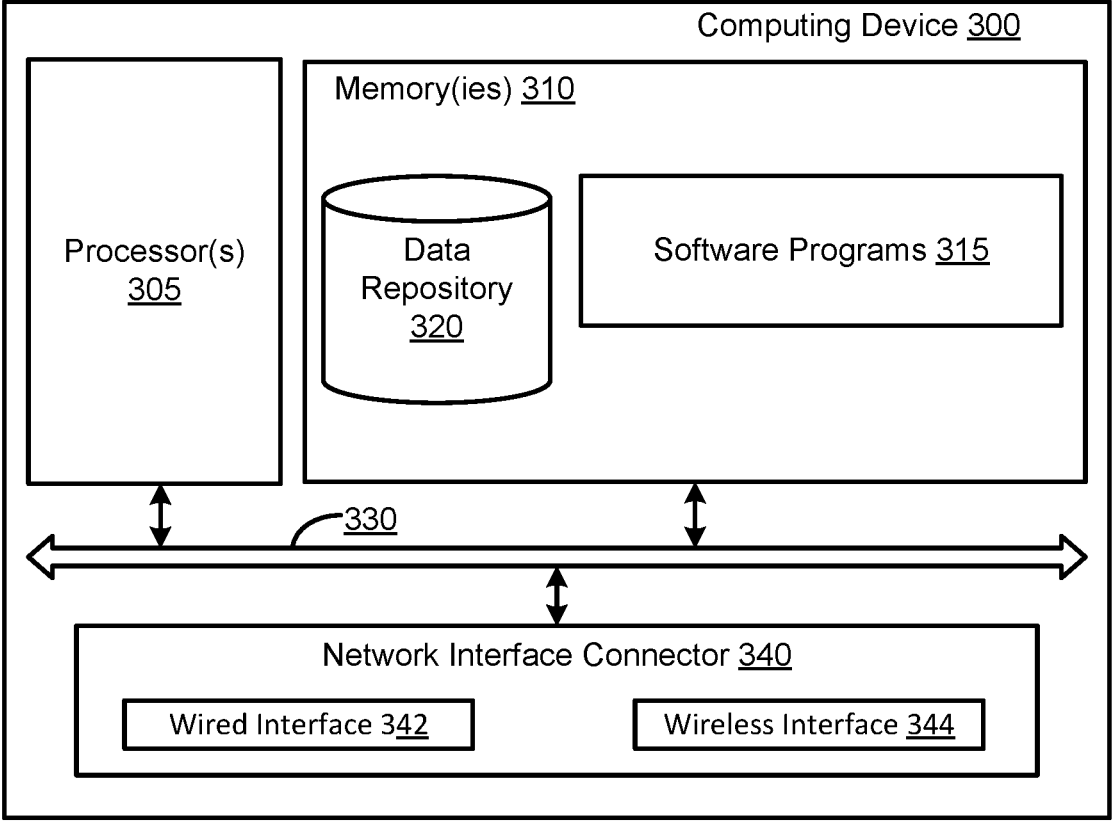
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for digital document exchange, comprising:
receiving, by a document exchange computer program, a document;
ingesting, by the document exchange computer program, the document;
identifying, by the document exchange computer program, a folder for the document;
storing, by the document exchange computer program, the document in the folder;
identifying, by the document exchange computer program, a target for the document;
notifying, by the document exchange computer program, the target that the document was received;
generating, by the document exchange computer program, a checklist using a trained machine learning engine that is trained to predict documents required for a transaction type; and
updating, by the document exchange computer program, the checklist to reflect receipt of the document.

2. The method of claim 1, wherein the step of ingesting the document comprises:
performing optical character recognition on the document.

3. The method of claim 1, wherein the step of ingesting the document comprises:
determining, by the document exchange computer program, that the document comprises relevant data.

4. The method of claim 3, wherein the step of ingesting the document further comprises:
determining, by the document exchange computer program, that the document is complete.

5. The method of claim 1, wherein the folder is identified based on a subject of the document, a party to the document, and/or a submitter of the document.

6. The method of claim 1, wherein the document exchange computer program predicts the target using a machine learning system.

7. A non-transitory computer readable storage medium, including instructions stored thereon, which when read and executed by one or more computer processors, cause the one or more computer processors to perform steps comprising:
receiving a document;
ingesting the document;
identifying a folder for the document;
storing the document in the folder;
identifying a target for the document;
notifying the target that the document was received;
generating a checklist using a trained machine learning engine that is trained to predict documents required for a transaction type; and
updating the checklist to reflect receipt of the document.

8. The non-transitory computer readable storage medium of claim 7, wherein the step of ingesting the document comprises instructions that, when executed by the one or more computer processors, cause the one or more computer processors to perform optical character recognition on the document.

9. The non-transitory computer readable storage medium of claim 7, wherein the step of ingesting the document comprises instructions that, when executed by the one or more computer processors, cause the one or more computer processors to determine that the document comprises relevant data.

10. The non-transitory computer readable storage medium of claim 9, wherein the step of ingesting the document further comprises instructions that, when executed by the one or more computer processors, cause the one or more computer processors to determine determining that the document is complete.

11. The non-transitory computer readable storage medium of claim 7, wherein the folder is identified based on a subject of the document, a party to the document, and/or a submitter of the document.

12. The non-transitory computer readable storage medium of claim 7, further including instructions that, when executed by the one or more computer processors, cause the one or more computer processors to perform steps comprising:
comparing the document to a prior version of the document to identify a change; and
providing the change to the target.

13. The non-transitory computer readable storage medium of claim 12, further including instructions that, when executed by the one or more computer processors, cause the one or more computer processors to perform steps comprising:
determining, using a large language model, an importance of the change; and
providing the importance of the change to the target.

14. The non-transitory computer readable storage medium of claim 7, wherein the target is predicted using a machine learning system.

15. A method for digital document exchange, comprising:
receiving, by a document exchange computer program, a document;
ingesting, by the document exchange computer program, the document;
identifying, by the document exchange computer program, a folder for the document;
storing, by the document exchange computer program, the document in the folder;
identifying, by the document exchange computer program, a target for the document;
notifying, by the document exchange computer program, the target that the document was received;
comparing, by the document exchange computer program, the document to a prior version of the document to identify a change;
determining, by the document exchange computer program and using a large language model, an importance of the change; and
providing, by the document exchange computer program, the change and the importance of the change to the target.

* * * * *